United States Patent [19]

Matsuura et al.

[11] Patent Number: 5,224,759
[45] Date of Patent: Jul. 6, 1993

[54] DOUBLE LOCK RECLINER FOR AUTOMOTIVE SEAT

[75] Inventors: Hiroshi Matsuura; Yoshitaka Negi, both of Shizuoka, Japan

[73] Assignee: Fuji Kiko Co., Ltd., Japan

[21] Appl. No.: 976,008

[22] Filed: Nov. 13, 1992

Related U.S. Application Data

[63] Continuation of Ser. No. 571,110, Aug. 23, 1990, abandoned.

[30] Foreign Application Priority Data

Aug. 31, 1989 [JP] Japan ............... 1-102337[U]

[51] Int. Cl.⁵ ............................................. B60N 2/02
[52] U.S. Cl. ................................... 297/367; 297/379
[58] Field of Search ............... 297/367, 368, 369, 366, 297/372, 379

[56] References Cited

U.S. PATENT DOCUMENTS

| | | | |
|---|---|---|---|
| 3,966,253 | 6/1976 | Berghof et al. | 297/367 |
| 4,218,092 | 8/1980 | Schach et al. | 297/367 |
| 4,384,744 | 5/1983 | Barley | 297/367 |
| 4,394,048 | 7/1983 | Sakurai et al. | 297/379 X |
| 4,541,672 | 9/1985 | Fukuta et al. | 297/367 |
| 4,611,853 | 9/1986 | Lehmann et al. | 297/367 X |
| 4,629,252 | 12/1986 | Myers et al. | 297/367 X |
| 4,770,563 | 9/1988 | Nishino . | |
| 4,793,653 | 12/1988 | Kanazawa | 297/369 X |
| 4,874,205 | 10/1989 | Arefinejad et al. | 297/367 X |
| 4,898,424 | 2/1990 | Bell | 297/367 |

FOREIGN PATENT DOCUMENTS

| | | |
|---|---|---|
| 2269433 | 11/1975 | France . |
| 2606337 | 11/1986 | France . |
| 2033467 | 5/1980 | United Kingdom . |
| 2078850 | 1/1982 | United Kingdom . |

Primary Examiner—Jose V. Chen
Attorney, Agent, or Firm—Ronald P. Kananen

[57] ABSTRACT

A double lock seat recliner has a primary recliner device which and a secondary recliner device are connected by a rotary linking rod. A first lever is pivotally mounted on a pivot of a release lever. A second lever is connected with the first lever by a connecting pin. The second lever cooperates with the rotary linking rod. A third lever pivotally cooperates with the rotary lever. A fourth lever is pivotally connected to the third lever via a connecting pin. The fourth lever cooperates with a pivot shaft of a locking member of the auxiliary recliner device. The third lever is mounted on the inner side of a base plate. On the other hand, the fourth lever is mounted on the outside of the base plate. The connecting pin for cooperably connecting the third lever with the fourth lever extends through an elongated slot formed through the base plate.

4 Claims, 4 Drawing Sheets

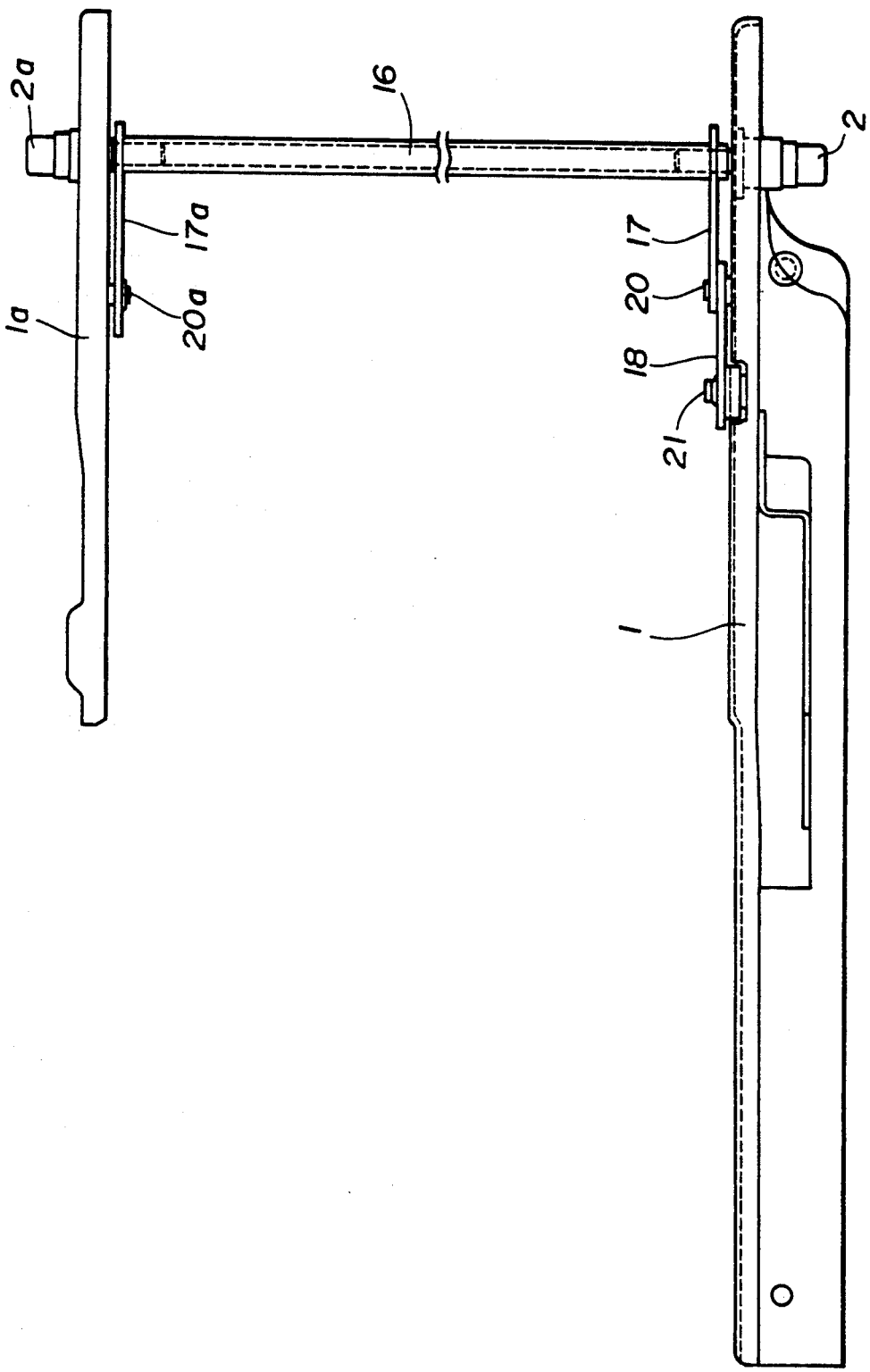

DOUBLE LOCK RECLINER FOR AUTOMOTIVE SEAT

This application is a continuation of application Ser. No. 07/571,110 filed Aug. 23, 1990 now abandoned.

BACKGROUND OF THE INVENTION

1. Field of the Invention

The present invention relates generally to a recliner for adjusting a reclining position of a seat back of an automotive seat. More specifically, the invention relates to a double lock recliner which includes a pair of recliner devices at both sides of an automotive seat.

2. Description of the Background Art

In general, an automotive seat, particularly a front seat, is capable of adjusting a tilting angle of a seat back relative to a seat cushion so as to permit adjustment a seating position of the seat occupant. For this purpose, a recliner is provided for permitting pivotal movement of the seat back relative to the seat cushion. Normally, the seat recliner includes a singular recliner device oriented at one side of the seat and a pivot device at the other side of the seat. In such construction, since the pivot device has no capability of locking the seat at the selected reclining position or tilting position of the seat back, distortion or twisting of the seat back can be caused to degrade comfort at the seat.

For improving this, there has been recently proposed a so-called double lock recliner which has symmetric recliner devices at both sides of the seat. Because the recliner devices are provided at both sides of the seat, locking at each respective recliner device has to be released. As can be naturally appreciated, an independent lock releasing operation for each respective recliner device should be too cumbersome or troublesome for the seat occupant and thus is preferred to be avoided. For this purpose, the recently proposed double lock recliner comprises a primary recliner device which incorporates a release structure operable by means of a manually operable release lever for releasing locking, and an auxiliary recliner device to be oriented at the side opposite to the primary recliner device. In such construction, the auxiliary recliner device is connected to the primary recliner device by means of a rotary lever. The link lever carries a pivotal lever which is connected to an operation lever pivotally mounted on a base plate. The operation lever carries an operation pin associated with an elongated slot formed through the base plate. The operation pin is connected to an actuation level associated with a locking tooth member.

With this construction, the operational input through the manually operable release lever of the primary recliner device can be transferred through the rotary lever for synchronous operation of the auxiliary recliner device.

On the other hand, in the usual automotive seat, a buckle device for a safety belt is to be provided at one side of the seat. The buckle device is normally provided at an inner side i.e., a (side adjacent the center line of the vehicle) of the seat, where the auxiliary recliner device can be provided. When an auxiliary recliner device is provided at the inner side of the seat, the buckle device can interfere with pivotal movement of the pivotal lever set forth above. For avoiding this interference, the base plate has to be large enough to permit installation of the buckle device with the auxiliary recliner device.

SUMMARY OF THE INVENTION

Therefore, it is an object of the present invention to provide a double lock recliner which does not require large space for installation of both of a seat belt buckle device and an auxiliary recliner device.

In order to accomplish the aforementioned and other objects, a double lock seat recliner, according to the present invention, has a primary recliner device which and a secondary recliner device which are connected by a rotary linking rod. A first lever is pivotally mounted on a pivot of a release lever. A second lever is connected with the first lever by means of a connecting pin. The second lever is cooperated with the rotary linking rod. A third lever is pivotally cooperated with the rotary lever. A fourth lever is pivotally connected to the third lever via a connecting pin. The fourth lever is cooperated with a pivot shaft of a locking member of the auxiliary recliner device. The third lever is mounted on the inner side of a base plate. On the other hand, the fourth lever is mounted on the outer side of the base plate. The connecting pin for cooperably connecting the third lever with the fourth lever extends through an elongated slot formed through the base plate.

According to one aspect of the invention, a double lock seat recliner for an automotive seat, comprises:

a first recliner device including a first locking mechanism for establishing engagement for locking a seat back of the seat at a selected reclining position, a manually operable release lever, a first lock release mechanism including a first lever means cooperated with the release lever for pivotal movement in response to manual operation of the lock release lever, the first lever means being pivotably mounted on one side of a first base plate;

a second recliner device including a second locking mechanism for establishing engagement for locking a seat back of the seat at a selected reclining position, a manually operable release lever, a second lock release mechanism including a second lever means cooperated with the release lever for pivotal movement in response to manual operation of the lock release lever, the second lever means being pivotably mounted on one side of a second base plate; and means for cooperating the first and second recliner devices for synchronous operation, the cooperating means including a rotary rod extending between the first and second recliner devices and first and second connecting levers fixed to both ends of the rotary rod the first and second connecting levers being oriented at the other side of the first and second base plates and coupled with first and second connecting pins extending through first and second elongated holes defined through the first and second base plates.

The second elongated hole may be differentiated in configuration from the first elongated hole so as to permit independent lock release operation irrespective of the first recliner device. The first elongated hole may be so constructed to permit movement of the first connecting pin in a first direction during locking and unlocking operation of the first locking mechanism, and the second elongated hole is so constructed to permit movement of the second connecting pin in the first direction and a second direction essentially perpendicular to the first direction during locking and unlocking operation of the second locking mechanism.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings:

FIG. 3 is a plan view of the preferred embodiment of the double lock recliner, in which the primary and secondary recliner devices are connected for cooperation by means of a rotary linking rod;

DESCRIPTION OF THE PREFERRED EMBODIMENT

Figure 1:
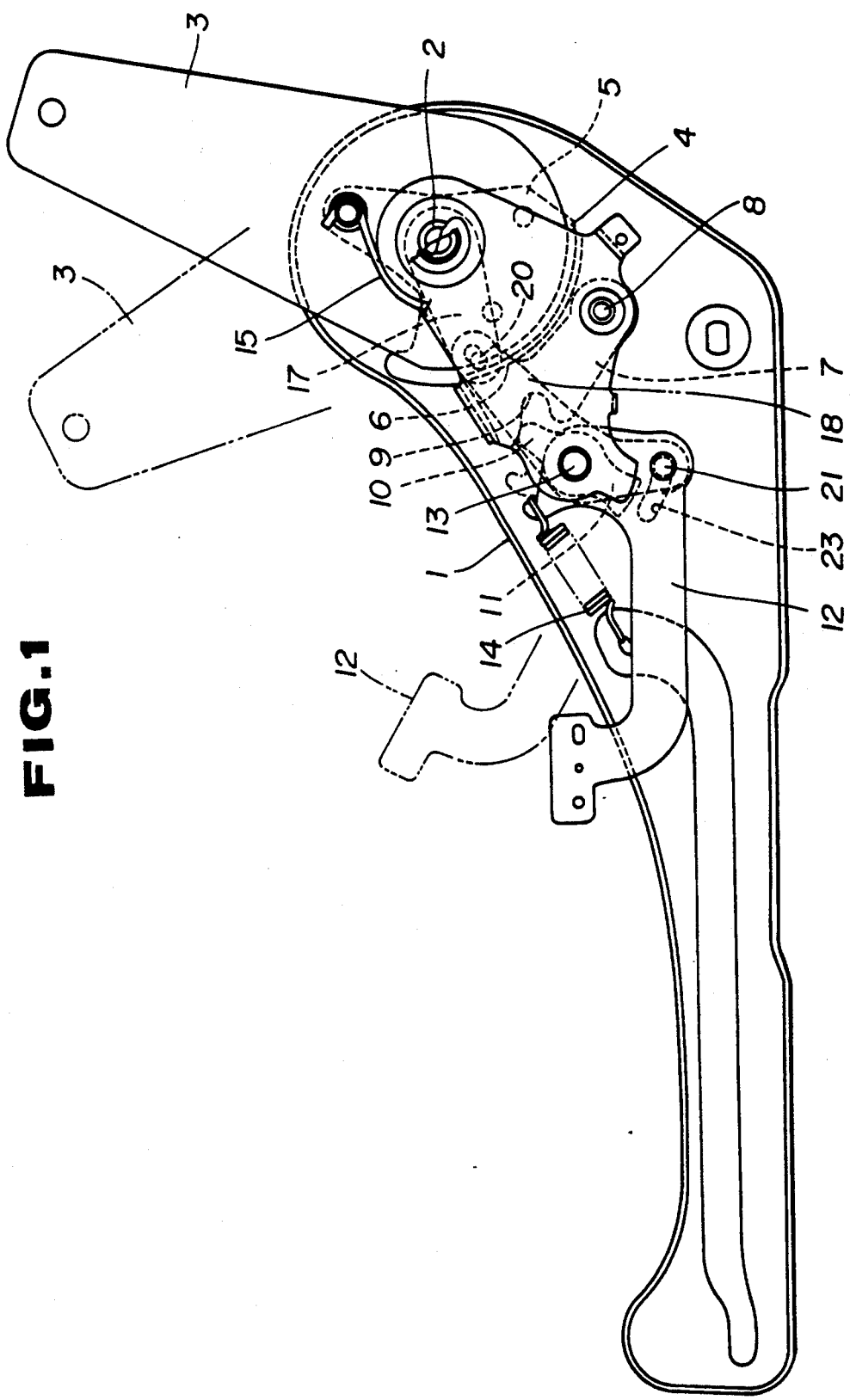
FIG. 1 is a side elevation of a primary recliner device of the preferred embodiment of a double lock recliner according to the present invention.
Figure 2:
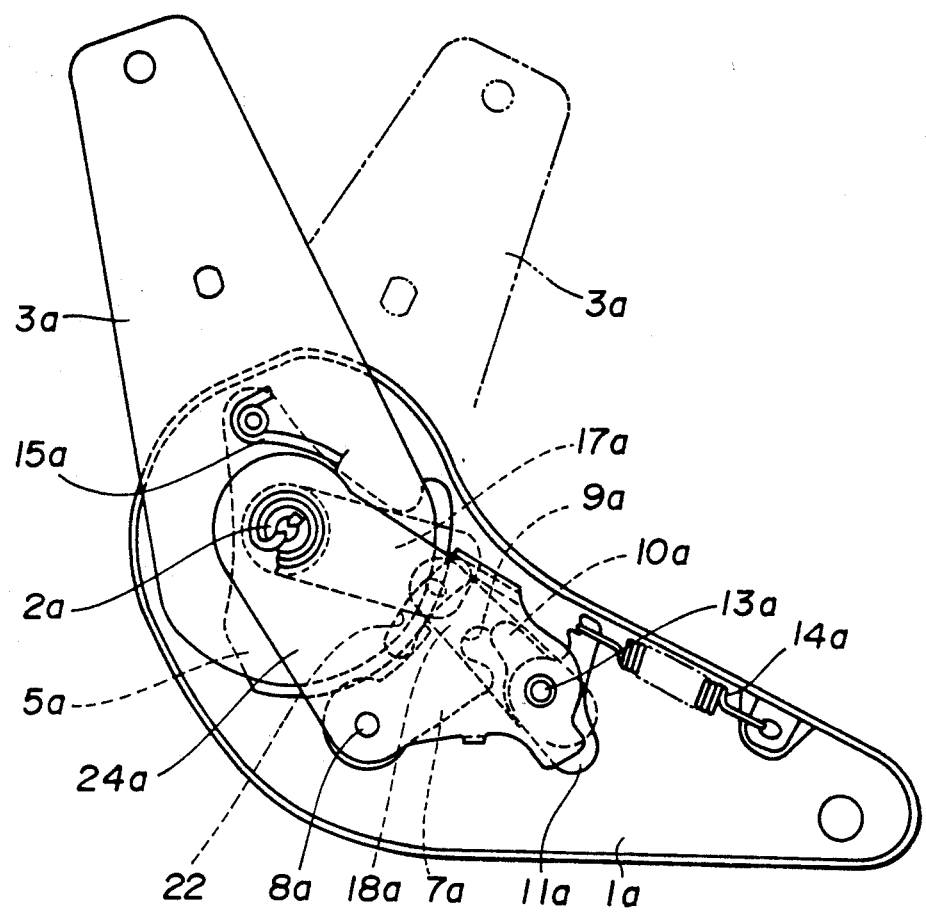
FIG. 2 is a side elevation of a secondary recliner device of the preferred embodiment of the double lock recliner according to the invention.

Referring now to the drawings, particularly to FIGS. 1 and 2, a primary recliner device is provided at an outside of an automotive seat, which words "outside of the seat" are used for identification of the orientation transversely remote from the center line of the vehicle. An auxiliary recliner device is provided at an inside of the automotive seat, which words "inside of the seat" are used for identification of the orientation transversely close to the center line of the vehicle and thus opposite to the outside. Respective of the primary and the auxiliary recliner devices are provided at rear end positions of the seat.

As shown in FIG. 1, the primary recliner device has a base plate 1. A pivotal arm 3 is rigidly fitted on the outer side portion of a seat back (not shown) of an automotive seat. The pivotal arm 3 is pivotally mounted on a pivot 2. A first toothed member 5, which is formed with locking teeth 4 in a predetermined angular range, cooperates with the pivotal arm 3. A second toothed member 7 is pivotably mounted on the base plate 1 for pivotal movement about a pivot 8. The second toothed member 7 is formed with teeth 6 interengageable with the locking teeth 4 of the first toothed member 5. The second toothed member 7 is formed with a recess 9. The recess 9 is engageable with a locking projection 10 of a locking member 11 which cooperates with a release lever 12 for cooperation therewith. The release lever 12 is pivotally mounted on the base plate 1 for pivotal movement about a pivot 13. The release lever 12 is resiliently biased in a counterclockwise direction in FIG. 1 by means of a bias coil spring 14 which is connected to the base plate 1 at one end and to the release lever 12 at the other end. A spiral spring 15 is provided. The spiral spring 15 has one end engaged with the pivotal arm 3 and the other end engaged with the pivot 2. With this construction, the pivotal arm 3 is biased in a counter clockwise direction in FIG. 1 by means of the spiral spring 15.

On the other hand, as shown in FIG. 2, a pivotal arm 3a is rigidly fitted on the inner side portion of the seat back similarly to the pivotal arm 3 set forth above. The pivotal are 3a is mounted on a base plate 1a via a pivot 2a. The pivotal are 3a is coupled with a first toothed member 5a for pivotal movement therewith. The first toothed member 5a is engaged with a second toothed member 7a which is pivotably supported on the base plate 1a about a pivot 8a. The second toothed member 7a defines a locking recess 9a which is engagable with a locking projection 10a formed with the locking member 11a which is pivotable about a pivot 13a extended from the base plate 1a. The locking member 11a is resiliently biased in a clockwise direction by means of a coil spring 14a for pivotal motion about the pivot 13a. On the other hand, the pivotal arm 3a is biased in a clockwise direction by a spiral spring 15a.

As can be seen from FIGS. 1 and 2, holder plates 24 and 24a are provided for supporting free ends of respective pivots 2, 8, 13 and 2a, 8a, 13a.

Figure 4:
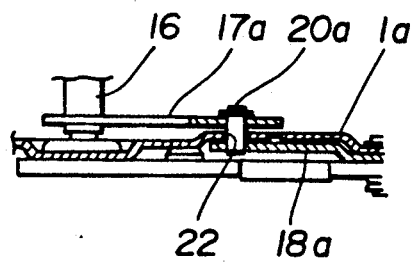
FIG. 4 is an enlarged section of major part of the secondary recliner device of the preferred embodiment of the double lock recliner according to the invention.
Figure 6:
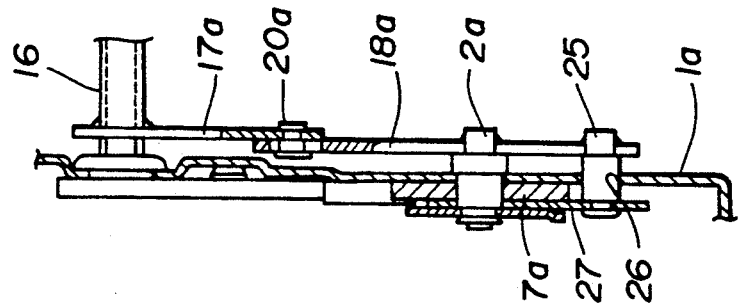
Figure 5:
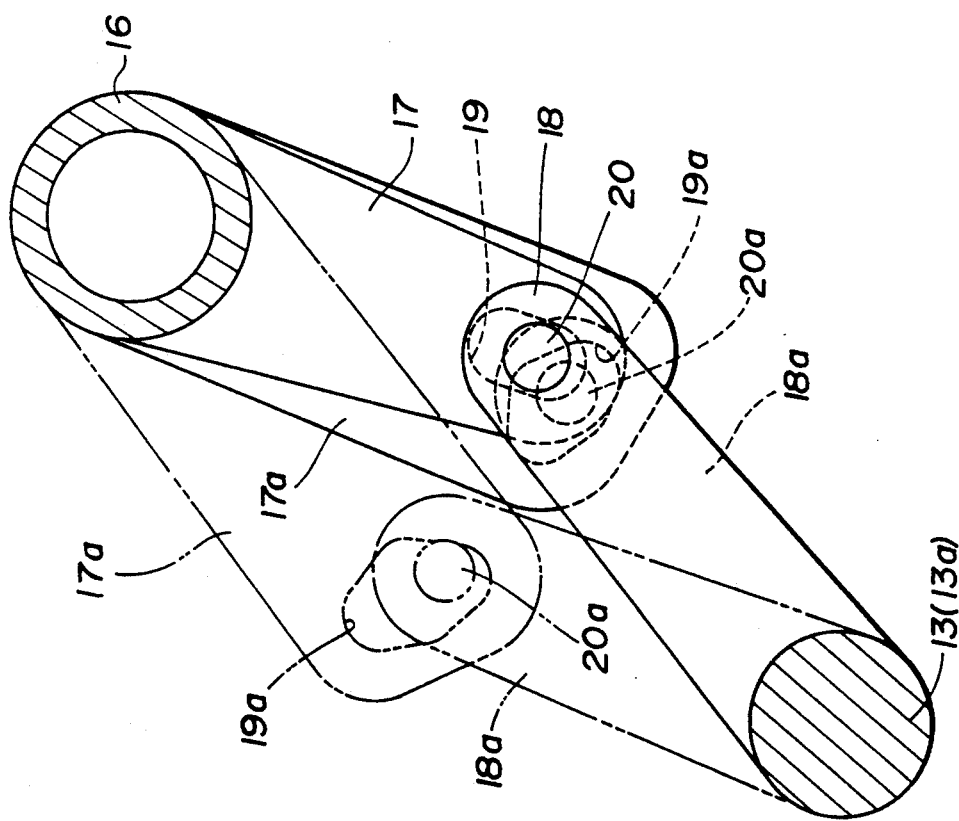
FIG. 5 is a side elevation showing relative motion of the rotary linking rod and an actuation lever in the auxiliary recliner device.

As shown in FIG. 3, the pivots 2 and 2a are connected to one another by means of a rotary linking rod 16. At its respectively opposed ends, the linking rod 16 is connected to a second link lever 17 and a third link lever 17a which has different lever length relative to the second link lever. On the other hand, a first link lever 18 which is of generally crank shaped configuration in plan view, is rigidly secured to the pivot 13 of the release lever 12. The release lever 12 and the the first link lever 18 are interconnected to each other via a connecting pin 21 as shown in FIG. 1. The connecting pin 21 extends through an arc shaped elongated slot 23 defined through the base plate 1. On the other hand, a fourth link lever 18a is oriented on the outside face of the base plate 1a. The fourth link lever 18a is pivotable about the pivot 13a, about which the locking member 11a is pivotally provided, as shown in FIG. 4. Namely, as seen from FIG. 4, a pin 20a extends from the front end of the fourth link lever 18a. The pin 20a extends through an arc shaped slot 22 of FIG. 2. With this construction, even when the seat belt buckle is mounted on the inner face of the base plate 1a, the buckle may not interfere with pivotal movement of the fourth link lever 18a. Furthermore, as can be seen, the second link lever 17 is formed with a shorter length than the third lever 17a. On the other hand, the fourth link lever 18a is formed with a shorter length than the first link lever 18. The second and third link levers 17 and 17a are respectively rigidly secured to both transverse ends of the linkage rod 16 a mutually identical angular relationship with the linkage rod. The first and second link levers 18 and 20 cooperate by engaging a the connecting pin 20 extending from the end of the first link lever 18, and an elongated hole 19 formed through the second link lever 17 for cooperative movement with each other. Similarly, the fourth lever 18a has a connecting pin 20a engaging with an elongated hole 19a which is differentiated in configuration from that elongated hole 19 as can be seen from FIG. 5. Namely, in the shown construction, the elongated hole 19a is designed to permit the action of the connecting pin 20a in the same direction to that of the connecting pin 20 when the primary and auxiliary recliner devices cooperates for synchronous operation. The elongated hole 19a is also designed for permitting action of the connection pin 20a essentially perpendicular to the motion direction of the connecting pin 20 of the primary recliner device. With this construction, the auxiliary recliner device is allowed a lock releasing operation independently of the primary recliner device.

With the shown construction, when the release lever 12 is pulled upwardly for causing clockwise rotation in FIG. 1, the connecting pin 21 shifts to cause clockwise pivotal movement of the first link lever 18 about the pivot 13. Since the pin 20 carried by the first link lever 18 is engaged with the elongated hole 19 of the second link lever 17, the second link lever 17 is pivoted in a counterclockwise direction at the same time with clockwise pivotal movement of the first link lever 18. According to this, the linkage rod 16 is driven to rotate. At the same time, the locking member 11 is driven to rotate a clockwise direction to engagement between the projection 10 of the locking member 11 with the locking recess 9 of the second tooth member 7. By this, the second toothed member 7 is driven to pivot in counterclockwise direction. By this, the engagement between the teeth of the first and second toothed members 5 and 7 can be released. Then, the pivotal arm 3 becomes free from restriction and thus pivotally moved by the spring force of the spiral spring 15 a counterclockwise direction.

According to rotation of the linkage rod 16, the third link lever 17a which is rigidly fixed with the other end of the linkage rod 16 is driven pivotally. According to this, the fourth link lever 18a is pivotally moved about the pivot 13a a counterclockwise direction. By this, the locking member 11a is pivotally moved a counterclockwise direction. By this, the projection 10a of the locking member 11a comes into engagement with the locking recess 9a. Therefore, the second toothed member 7a is driven a clockwise direction about the pivot 8a. Therefore, locking engagement between the first and second tooth members 5a and 7a can be released. Therefore, the pivotal arm 3a becomes free from restriction and thus driven by the spring force of the spiral spring 15a.

In the shown construction, interference of the pivotal motion of the fourth link lever 18a by the seat belt buckle mounted on the base plate will not be caused. Therefore, extra space of the base plate required or installation of the seat belt buckle becomes unnecessary.

While the present invention has been discussed in detail in terms of the preferred embodiment with reference to the accompanying drawings, the invention can be embodied in various fashion and thus need not be limited to the shown construction. Therefore, the invention should be understood to include all possible embodiments and modifications which can be implemented without departing from the principle of the invention set out in the appended claims.

What is claimed is:

1. In an automotive seat:
   a first base plate;
   a second base plate arranged in spaced relationship with said first base plate;
   a rotary rod interconnecting said first and second base plates, said rotary rod having one end portion adjacent said first base plate and the opposite end portion adjacent said second base plate;
   a first link lever having one end fixedly connected to said rotary rod at said one end portion thereof for rotation therewith, said first link lever having an opposite end portion formed with a first hole;
   a second link lever pivotally mounted to said first base plate and having one end portion formed with a first pin engaged in said first hole of said first link lever and an opposite end portion;
   said first pin and said first hole being so constructed and arranged that said first pin is allowed to move within said first hole in a radial direction with respect to rotation of said first link lever with said rotary shaft;
   a manual release lever pivotally mounted to said first base plate and engaged with said opposite end portion of said second link lever;
   a first locking member cooperating with said manual release lever for angular movement with said manual release lever;
   a third link lever having one end fixedly connected to said rotary rod at the opposite end portion thereof for rotation therewith, said third link lever having an opposite end portion formed with a second hole;
   a fourth link lever having one end portion pivotally mounted to said second base plate and an opposite end portion formed with a second pin engaged in said second hole;
   said second pin and said second hole being so constructed and arranged that said second pin is allowed to move within said second hole in an angular direction with respect to rotation of said third link lever with said rotary shaft; and
   a second locking member mounted to said second base plate for angular movement with said fourth link lever;
   said second pin being radially distant from said rotary rod further than is said first pin, whereby rotation of said rotary shaft through an angle causes the second locking member to move angularly more than does the first locking member.

2. An automotive seat as claimed in claim 1, wherein said third link lever is disposed on that side of said second base plate which is disposed near said first base plate, and said fourth link lever is disposed on the opposite side of said second base plate, and wherein said second base plate is formed with an arc shaped slot through which said second pin extends.

3. An automotive seat as claimed in claim 1, wherein said first hole is an elongated hole.

4. An automotive seat as claimed in claim 1, wherein said second hole is an elongated hole.

* * * * *